United States Patent [19]

Wyatt

[11] 3,960,717
[45] June 1, 1976

[54] PROCESS FOR TREATING WASTE WATER
[75] Inventor: Kenneth Wyatt, Oswestry, England
[73] Assignee: Air Products and Chemicals, Inc., Allentown, Pa.
[22] Filed: June 7, 1974
[21] Appl. No.: 477,526

Related U.S. Application Data
[63] Continuation of Ser. No. 323,227, Jan. 12, 1973, abandoned.

[30] Foreign Application Priority Data
Jan. 20, 1972   United Kingdom................ 2852/72

[52] U.S. Cl.......................................... 210/6; 210/7; 210/15
[51] Int. Cl.².......................................... C02C 1/06
[58] Field of Search ................................... 210/3–7, 210/15–16, 14, 195, 196, 197

[56] References Cited
UNITED STATES PATENTS

| | | |
|---|---|---|
| 3,423,309 | 1/1969 | Albertson ............................. 210/5 |
| 3,547,814 | 12/1970 | McWhirter ............................ 210/6 |
| 3,579,439 | 5/1971 | Meiring et al. ........................ 210/5 |
| 3,660,277 | 5/1972 | McWhirter et al. .................... 210/7 |
| 3,670,887 | 6/1972 | McWhirter ............................ 210/7 |
| 3,733,264 | 5/1973 | Spector et al.......................... 210/7 |
| 3,764,523 | 10/1973 | Stankewich, Jr....................... 210/7 |

OTHER PUBLICATIONS
Culp et al., "Advanced Wastewater Treatment," Reinhold Co. (1971), pp. 51–68, 282, 283.

Primary Examiner—Charles N. Hart
Assistant Examiner—Benoit Castel
Attorney, Agent, or Firm—Ronald B. Sherer; Barry Moyerman

[57] ABSTRACT

A process for treatment of waste water in an enriched oxygen environment has a pretreatment stage where the waste water is stripped of nitrogen with a stripping gas having a nitrogen partial pressure less than the partial pressure of nitrogen in ambient air before treatment in the oxygen enriched environment.

Figure 3:
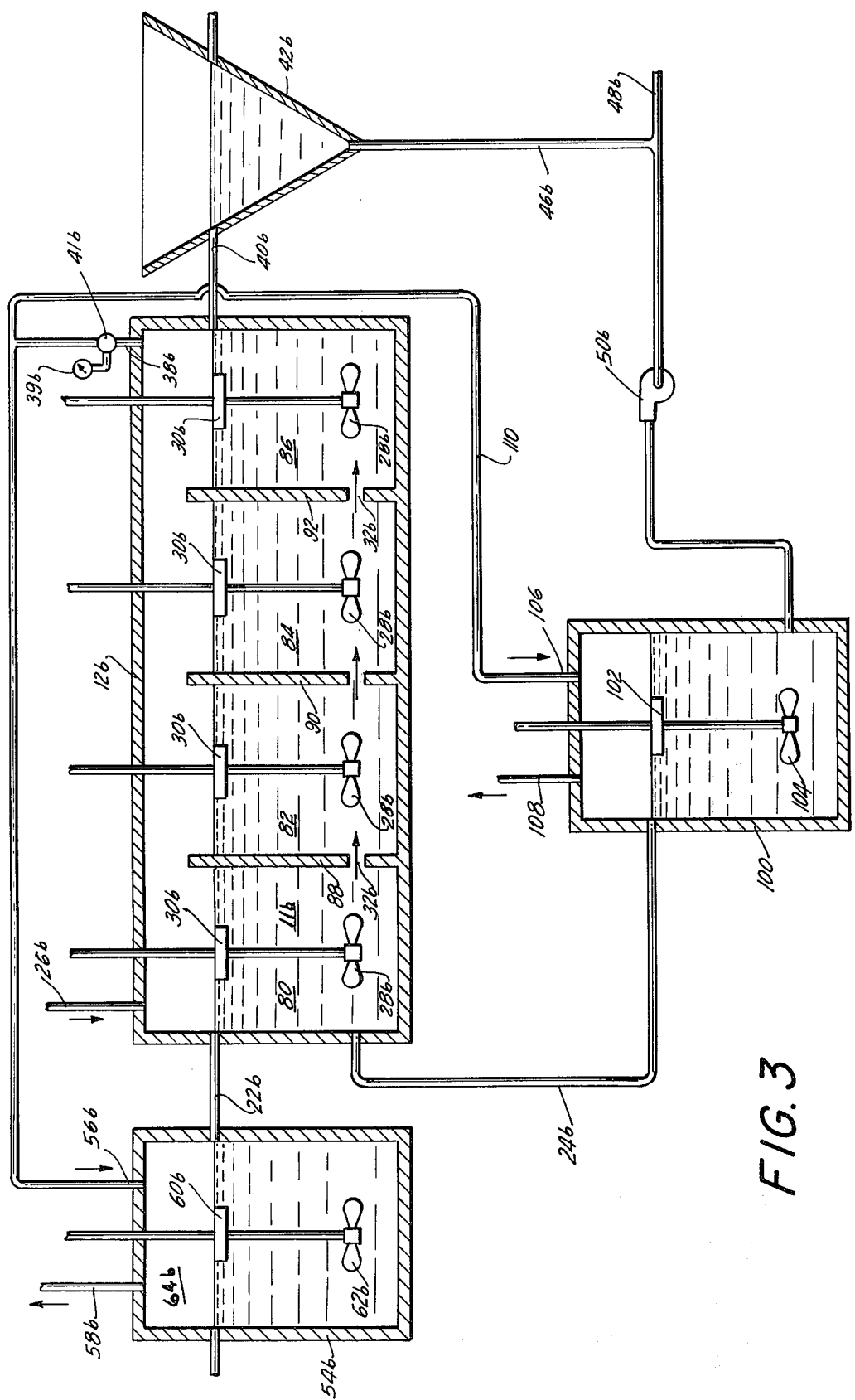

8 Claims, 5 Drawing Figures 3,960,717

PROCESS FOR TREATING WASTE WATER

This is a continuation of application Ser. No. 323,227, filed Jan. 12, 1973 now abandoned.

This invention relates to the treatment of biological oxygen demand (BOD)-containing waste water and more particularly to a waste water treatment process and system which removes at least a substantial proportion of the dissolved nitrogen from the waste water prior to secondary treatment where the BOD content is substantially removed from the waste water.

In the treatment of waste water, such as domestic sewage and the treatment of chemical and industrial wastes, it is well known that the waste water must be treated to remove biologically degradable material. Various processes and systems have been proposed for treating such wastes including a process known as the activated sludge process, wherein the waste water to be treated is aerated in the presence of active micro-organisms and oxygen until the micro-organisms have stabilized the organic matter in the waste, and the bioprecipitation process where the waste water is precipitated or trickled through a filtration medium in the presence of active micro-organisms to stabilize the organic matter in the waste.

It has been suggested in U.S. Pat. Nos. 3,547,811, 3,547,812, 3,547,813, 3,547,814 and 3,547,815 that improved waste water treatment by the activated sludge process can be obtained by treating a mixed liquor of waste water and recycled active biomass in an enriched oxygen environment. When using such a treatment process it is of course necessary to enclose the mixed liquor treatment tanks to retain an enriched oxygen environment above the liquid level of the mixed liquor and to have controlled venting of gas from the enclosed tank. The vent gas principally comprises nitrogen gas, which is released from the mixed liquor, as well as carbon dioxide and nitrogen compound gases resulting from the biodegradation of the waste.

In the biological treatment of waste water, for example by the activated sludge process, the amount of oxygen transferred to the mixed liquor, i.e. the waste water to be treated and recycled biomass or activated sludge, is of critical importance, since oxygen transfer is one of the primary limiting factors influencing the efficiency of the activated sludge system. Adequate dissolved oxygen levels result in a healthy biomass, which permits stable operation of the system because adequate driving force is maintained between the gas and liquid phases. When operating an activated sludge sewage treatment process where one or more of the stages are carried out in an oxygen enriched environment, it is apparent that higher dissolved oxygen levels can be maintained in the mixed liquor with less mixing energy and the mixed liquor need not be treated for as long a period of time for comparable removal of BOD compared to a conventional air activated sludge treatment process. Thus, one of the advantages utilizing an oxygen-enriched environment for the activated sludge waste water treatment process is the saving in energy cost for mechanical aeration as well as less requirement for tankage because of the increased efficiency of BOD removal.

The present invention provides an improved process and system for operation of a waste water treatment facility utilizing one or more enriched oxygen environment treatment stages.

While preferably the present invention may be utilized in a waste water treatment facility of the activated sludge type, it is to be understood that it is equally adaptable to any other type of waste water treatment which utilizes an enriched oxygen environment treatment stage.

When operating a waste water treatment facility, for example an activated sludge treatment process in which an oxygen enriched gas is used, the aeration stages, which may be one or more liquid stages, are operated in an enclosed aeration tank in an oxygen enriched environment and the ambient air comprising approximately 79% by volume nitrogen is effectively sealed off from the mixed liquor. Thus, the partial pressure of oxygen, carbon dioxide, nitrogen or nitrogen compound gases above the mixed liquor in the enclosed aeration tanks becomes a function of the oxygen-enriched aeration gas supplied to the aeration tank and the gases evolved during the biological degradation process.

Because the efficiency of the system can be increased by maximizing the oxygen partial pressure above the mixed liquor and maintaining a higher dissolved oxygen concentration, and since the oxygen partial pressure above the mixed liquor is a function of the oxygen content of the gas above the liquor, the efficiency of the system can be maximized by eliminating some of the propensity of the mixed liquor to give off other gases during the normal biodegradation reaction. In accordance with the present invention, this is accomplished by stripping dissolved nitrogen from the influent waste water prior to the waste water entering the enclosed mixed liquor aeration tanks in order to increase the propensity of the liquor to dissolve oxygen and in order to remove some of the nitrogen and to prevent formation of some of the nitrogen compound gases which would otherwise normally be evolved during the biodegradation reaction.

Throughout the specification and claims of this application, the words "stripping" and "strip" are to be taken to mean the removal of at least a substantial portion and are not intended to indicate a complete removal in the sense that might otherwise be inferred from the normal definition of the words stripping and strip.

It is an object of the present invention to provide an improved process for treating waste water utilizing an aeration step in an oxygen enriched environment.

It is another object of the present invention to provide an improved process for treating waste water which maximizes the oxygen partial pressure above the mixed liquor in an enclosed secondary treatment stage to create a greater driving force between the liquid and gas phases to satisfactorily sustain the biological reaction. The energy supplied to mechanical aeration devices is also a factor in maintaining a dissolved oxygen level in the liquor and the energy necessary to sustain the aeration devices to provide a satisfactory dissolved oxygen level is, among other factors, dependent upon the oxygen partial pressure in the gas phase in contact with the liquor.

A further object of the present invention is to provide such an improved process whereby dissolved nitrogen is stripped from the influent waste water and/or recycled activated sludge prior to secondary treatment in an enclosed aeration tank.

Accordingly, the present invention provides a waste water treatment process, which comprises pretreating said waste water in an enclosed waste water pretreatment zone by contacting said waste water with a pretreatment gas having a partial pressure of nitrogen less than the partial pressure of nitrogen in ambient air to thereby strip dissolved nitrogen gas from said waste water, feeding said pretreated waste water to an enclosed aeration zone, and biologically degrading the organic matter in said pretreated waste water in the presence of an oxygen enriched environment in said enclosed aeration zone.

The present invention also provides apparatus for treating waste water, comprising an enclosed pretreatment chamber having a waste water inlet and outlet and a strip gas inlet and outlet, and means for contacting waste water and strip gas to thereby strip dissolved nitrogen gas from said waste water; an enclosed aeration chamber having a waste water inlet and outlet and means for aerating waste water in said chamber to biologically degrade the organic matter in said waste water; and means for passing pretreated waste water from said enclosed pretreatment chamber waste water outlet to said enclosed aeration chamber waste water inlet.

The invention will now be more fully described by way of Examples with reference to the accompanying drawings.

Figure 1:
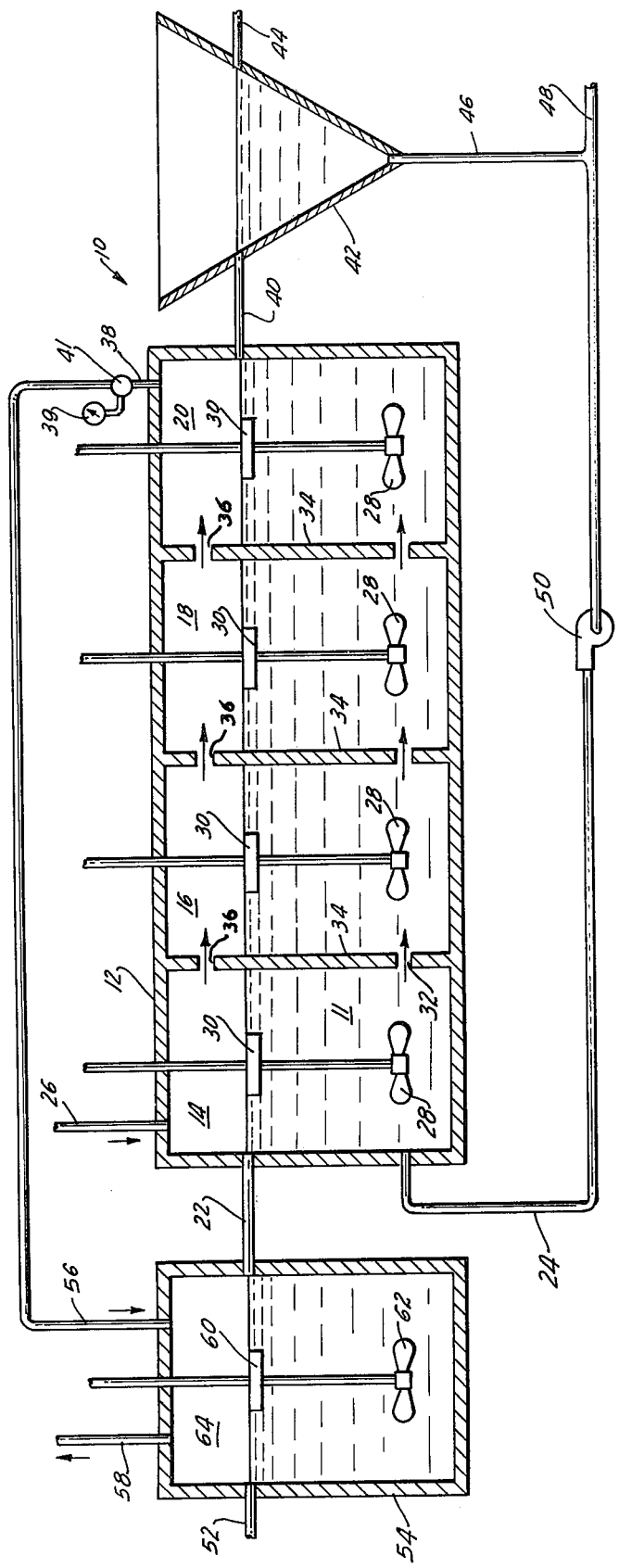

FIG. 1 is a schematic and diagrammatic sectional side view showing the improved waste water treatment process and system of the present invention; and FIGS. 2–5 are views similar to FIG. 1 showing alternate embodiments of the present invention.

With reference to the drawings and particularly FIG. 1, the improved activated sludge system for treating waste water 10 includes a secondary aeration zone 12 which illustratively is shown with four sub-chambers or stages 14, 16, 18 and 20. Any number of zones may be employed as desired.

The system 10 operates according to the activated sludge process by aerating influent waste water supplied to aeration zone 12 through inlet 22 and recirculated sludge supplied through inlet 24 as a mixed liquor 11 in aeration zone 12. Aeration zone 12 is an enclosed tank which is supplied with an oxygen-enriched aeration gas containing from about 80 to about 100% by volume of oxygen, preferably high-purity oxygen of on the order of 99.5% purity, at the head end of the tank through oxygen supply line 26.

Each of the sub-zones 14-20 are provided with submerged impellers 28 and surface aerators 30 to aerate the mixed liquor within the aeration zone and to agitate the mixed liquor to keep the solids in suspension. For the multi-stage system illustrated, liquor from sub-stage 14 is transferred to the next sub-stage 16 through restricted flow passage 32 in baffle 34 and, in like manner, the liquor is transferred from sub-zone 16 through to sub-zone 20. The oxygen enriched aeration gas flows co-currently to the liquor flowing between sub-stages 14-20 through restricted flow passages 36 in baffles 34 and is discharged from the enclosed aeration zone 12 at 38.

During the course of the flow of the mixed liquor through aeration zone 12, the micro-organisms from the recycled sludge feed on and biologically react with the organic particles in the waste utilizing the dissolved oxygen in the mixed liquor to biologically degrade the waste matter, and carbon dioxide and minor quantities of other gases are released as a result of that reaction. Nitrogen is also evolved from the liquor into the gas phase because the aeration gas in contact with the liquor has a nitrogen partial pressure favorable to evolution of nitrogen from the liquor.

After the final stage of aeration, the mixed liquor is discharged from the aeration zone 12 through discharge line 40 into a settling tank 42 where the flocculated sludge settles, and clarified effluent is drawn off from outlet 44 for tertiary treatment or, more commonly, for discharge to a receiving body of water.

The sludge is drawn off from settling tank 42 through line 46 and part of the sludge is diverted through line 48 for further treatment prior to disposal in, for example, digesters (not shown) while a portion of the sludge is recycled by pump 50 through line 24 back to aeration zone 12.

In the system just described, as the biological reaction proceeds through the stages of aeration zone 12, most of the oxygen supplied by the oxygen-enriched aeration gas is dissolved into the mixed liquor 11 and is utilized in the biological process. The micro-organisms feed on the nutrient organic matter in the waste and carbon dioxide, nitrogen and nitrogen compound gases evolve. Since in excess of 80% of the oxygen supplied to the system can be utilized, the vent gas will consist of a small volume of gas comprising a mixture of oxygen introduced by the oxygen-enriched aeration gas diluted by elemental nitrogen evolved from the liquor during the process and carbon dioxide generated by the biological reactions.

Control of the system can be maintained by controlling the oxygen content of gas exhausted at exhaust 38 by using an oxygen analyzer 39 in conjunction with an exhaust valve 41 to open the valve when the oxygen content is detected to be at a predetermined level, for example at a level above about 50% oxygen, by volume, and preferably from about 70 to about 90% oxygen, by volume. Thus, exhaust 38 vents gas only when the oxygen analyzer 39 detects that the oxygen content is at or above the predetermined oxygen enrichment and opens valve 41.

Control of the oxygen composition of the exhaust ensures that the oxygen enrichment of the aeration gas above the mixed liquor 11 throughout mixed liquor aeration zone 12 is sufficient to provide an oxygen partial pressure to maintain an adequate driving force between the oxygen and the mixed liquor to economically maintain a rate of dissolving oxygen into the liquor to sustain a healthy biological reaction between the micro-organisms and the organic matter in the waste.

The energy necessary for aeration, as dictated by the oxygen transfer efficiency of the aerators 30, is also a factor in the rate of dissolving oxygen into the mixed liquor and an optimum economic balance can be maintained between the cost of oxygen and the power requirements necessary to operate the mechanical aerators.

The influent waste water, before passage to aeration zone 12, is directed from influent line 52 to an enclosed nitrogen stripping tank 54. Tank 54 includes a gas inlet 56 to introduce a gas having a significantly lower nitrogen concentration than the nitrogen concentration in air, for example, an oxygen enriched gas. Tank 54 also includes a gas exhaust 58. Preferably, a surface aerator 60 and a submerged impeller 62 are also provided.

The gas entering nitrogen stripping tank 54 through gas inlet 56 can be pure oxygen or, preferably, may be the oxygen enriched gas exhausted from aeration zone 12. When operating the oxygen activated sludge process according to the present invention, it is desirable to maintain the concentration of oxygen in gas exhausted from the mixed liquor aeration zone 12 at above about 50% oxygen, by volume, preferably from about 70 to about 90% oxygen, by volume. Thus, analyzer 39 and valve 41 will be set to operate at this level. When so operated, gas inlet 56 may be placed in communication with mixed liquor aeration gas exhaust 38. Such operation is desirable to obtain maximum oxygen utilization from the oxygen supplied to the system.

The influent waste water is subjected to nitrogen stripping in an oxygen enriched environment in tank 54. Aerator 60 throws sheets of the influent waste water into the oxygen enriched aeration zone 64 above the liquid level and impeller 62 stirs the waste water to maintain the solid particles in solution and preclude settling of the solids.

Because the influent waste water entering nitrogen stripping tank 54 contains dissolved nitrogen based upon the large partial pressure of nitrogen in ambient atmosphere, the waste water, when subjected to the oxygen enriched environment within nitrogen stripping tank 54, releases free nitrogen gas and absorbs oxygen based upon the partial pressures of nitrogen and oxygen in the oxygen enriched environment of nitrogen stripping tank 54.

It is desired to remove a substantial portion of the nitrogen from the waste water in tank 54, and it is preferred to remove as much nitrogen as possible. However, the maximum amount of nitrogen that can be removed from the waste water is a function of several factors, including the nitrogen content of the incoming waste water, the oxygen content of the stripping gas supplied through line 56, and the residence time of the waste water in the stripping tank 54. As previously stated, the oxygen concentration of the gas vented from aeration tank 12 through line 38 may be controlled, and other methods of increasing the oxygen concentration will be set forth hereinafter with respect to FIGS. 2 and 4. In addition, it will be apparent that the residence time in the stripping tank 54 may be varied according to the size of the tank, as well as the use of multiple stages in which the stripping gas is conducted counter-current to the direction of flow of the waste water. Accordingly, in the practice of the present invention, these parameters should be controlled so as preferably to remove a minimum of 25%, by weight, of the nitrogen initially contained in the influent waste water, and more preferably, the process should be operated so as to remove 40%, by weight, or more of the nitrogen from the influent waste water in stripping tank 54. In some cases, it has been determined that of the order of 62%, by weight, of the nitrogen is desirably removed from the influent waste, thereby substantially lessening the dilution of the oxygen content in aeration tank 12. A range of from 25 to 65%, by weight, removal of nitrogen from the influent waste water is satisfactory.

The pretreatment of the waste water in tank 54 provides beneficial results in the subsequent activated sludge treatment process in that since there is less dissolved nitrogen in the waste water influent entering the activated sludge aeration treatment zone 12 than there is in the untreated waste water entering tank 54, less nitrogen and nitrogen compound gases are evolved within zone 12. Thus, the oxygen partial pressure in zone 12 can be maintained at a higher level due to the pretreatment in tank 54. Additionally, since oxygen is dissolved in the waste water prior to aeration zone 12, the influent waste water entering zone 12 has a higher dissolved oxygen level and less energy is required in mixed liquor aeration zone 12 to maintain adequate dissolved oxygen levels to support the biological degradation reaction.

Additionally, it is believed that the waste water, for example municipal sewage, prior to delivery to the waste treatment facility is subject to anaerobic conditions while flowing through sewer lines to the treatment facility. Anerobic activity is especially deleterious to waste treatment by the activated sludge process and results in the formation of sulphides, for example hydrogen sulphide, and fatty acids. Thus, waste water that is not subjected to nitrogen stripping in an oxygen enriched environment would require greater quantities of oxygen and the expenditure of more energy to treat in the activated sludge process.

However, nitrogen stripping in an oxygen enriched environment as in nitrogen stripping tank 54 reverses anaerobic decomposition which may have occurred, so that a healthier aerobic waste is introduced into the mixed liquor aeration zone 12. It is believed that this is the reason that the final effluent from clarifier 42 is clearer and less turbid than an effluent which is obtained from the same type of activated sludge treatment process without a nitrogen stripping pretreatment.

It is to be understood that various embodiments of the generic concept may be employed, and illustrative of some of these embodiments are the systems depicted in FIGS. 2–5. The embodiment of FIG. 1 could also be run by introducing oxygen enriched gas to stage 20 of aeration zone 12 and have the gas run countercurrent to the staged mixed liquor. The gas exhausted from stage 14 of zone 12 can then be directed to nitrogen stripping tank 54.

Figure 2:
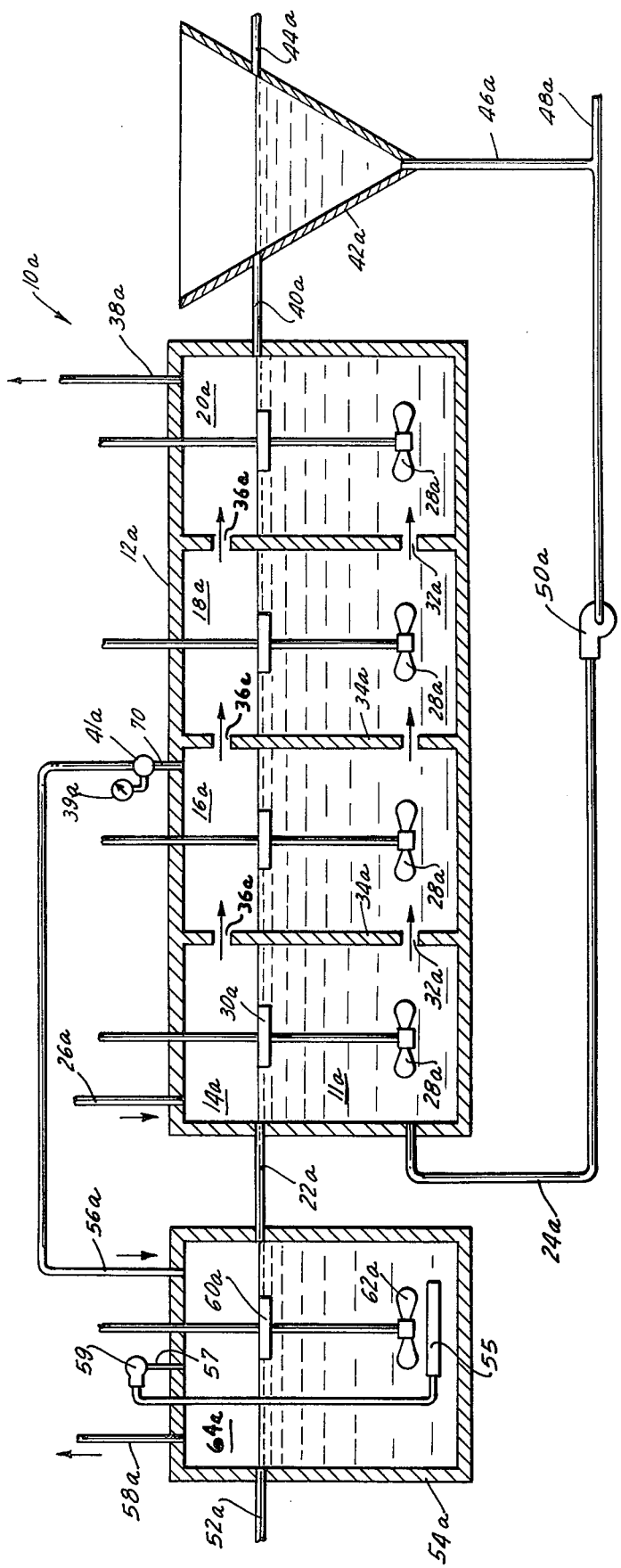

Referring now to FIG. 2 where like reference numerals with a subscript indicate elements which are the same as the embodiment of FIG. 1, mixed liquor 11a after waste water has been stripped of nitrogen in tank 54a is directed to mixed liquor aeration zone 12a and is transferred through sub-zones 14a, 16a, 18a and 20a. The liquor is drawn off through line 40a and is passed to settler 42a where it is allowed to settle, and sludge is drawn off at 46a with part of the sludge being recycled to mixed liquor aeration zone 12a through line 24a.

Oxygen enriched gas of about 80 to about 100%, by volume, of oxygen, preferably high purity oxygen of on the order of 99.5% purity, is introduced to mixed liquor aeration zone 12a at 26a and flows through the sub-aeration zones 14a–18a until it is exhausted at 38a. Where it is desirous to exhaust the aeration gas at 38a at an oxygen content of from 21 to below 80% oxygen, by volume, the recycled oxygen enriched gas for nitrogen strippiing tank 54a may be diverted from any one of the intermediate subzones 16a or 18a. Accordingly, an oxygen exhaust outlet 70 controlled by analyzer 39a and valve 41a is provided in, for example, sub-zone 16a and a portion of the aeration gas from subzone 16a is diverted to inlet 56a of nitrogen stripping tank 54a. Preferably, the gas diverted from sub-zone 16a will have an oxygen content above 80%, by volume, although any oxygen content in excess of the oxygen content of air will have beneficial results when used in the nitrogen stripping tank 54a. Of course, a gas with the lowest nitrogen content will be most beneficial.

Tank 54a is illustrated with a submerged sparger 55 below submerged impeller 62a and the sparger bubbles the oxygen enriched gas through the waste water in nitrogen stripping tank 54a. A gas suction line 57 is provided which is in communication with recycle pump 59 to draw oxygen enriched gas from aeration zone 64a and pump it to sparger 55. The arrangement of the sparger with a recirculation pump can be used in place of a surface aerator if desired and it is understood that either arrangement could be used in any of the disclosed embodiments.

In the embodiment shown in FIG. 3, the mixed liquor aeration zone 12b is provided with liquor sub-zones 80, 82, 84 and 86 defined by partial baffles 88, 90 and 92, while aerators 30b and impellers 28b operate as in the embodiment in FIG. 1 and with the mixed liquor flowing through flow restrictions 32b in the baffles 88, 90 and 92. However, the aeration gas does not flow through separate sub-zones or stages, since the partial baffles extend only slightly above the liquor surface and thus do not restrict the flow of aeration gas. In this embodiment 99.5% purity oxygen may be introduced at 26b and withdrawn at 38b at an oxygen concentration above 80%, by volume, and diverted to the nitrogen stripping tank 54b to strip nitrogen from the influent waste water. Alternatively 99.5% purity oxygen could be introduced at 38b and withdrawn at 26b as well; of course controller 39b would then have to be located in line 26b.

Since, as pointed out above, the beneficial aspects of this invention reside in stripping nitrogen from the waste water prior to treatment by the activated sludge process in the aeration zone, in some applications it is also beneficial to strip nitrogen from the recycled sludge prior to its introduction to the aeration zone. An enclosed sludge nitrogen stripping chamber 100 (FIG. 3) is provided which receives the sludge to be recycled. Enclosed nitrogen stripping chamber 100 is provided with a surface aerator 102, submerged impeller 104, a gas inlet 106 and a gas outlet 108. Gas inlet 106 is fed oxygen enriched gas through line 110 which is branched from gas exhaust line 38b of the mixed liquor aeration zone 12b. Hence, the recycled sludge is stripped of nitrogen in the presence of an oxygen enriched environment in chamber 100, and nitrogen which has been dissolved in the sludge, as well as any nitrogen which is generated by the sludge and dissolved therein during its retention in settler 42b, is stripped prior to the sludge being recycled to mixed liquor aeration zone 12b.

The addition of the nitrogen stripping chamber 100 for the recycled sludge, while shown as an alternative in the embodiment of FIG. 3, can, of course, be utilized in any of the other embodiments. The more nitrogen which can be stripped from the recycled sludge and waste water prior to their combination to form the mixed liquor in the activated sludge aeration zone results in increased advantages.

The addition of the sludge nitrogen stripping chamber may be important because the sludge as it settles in the settler exhibits a high absorption capacity for nitrogen from the ambient air. Thus, prior to return of the recycled sludge from the open-to-air settler the sludge is stripped of nitrogen in an enclosed chamber to strip nitrogen dissolved in the sludge in the settler.

Figure 4:
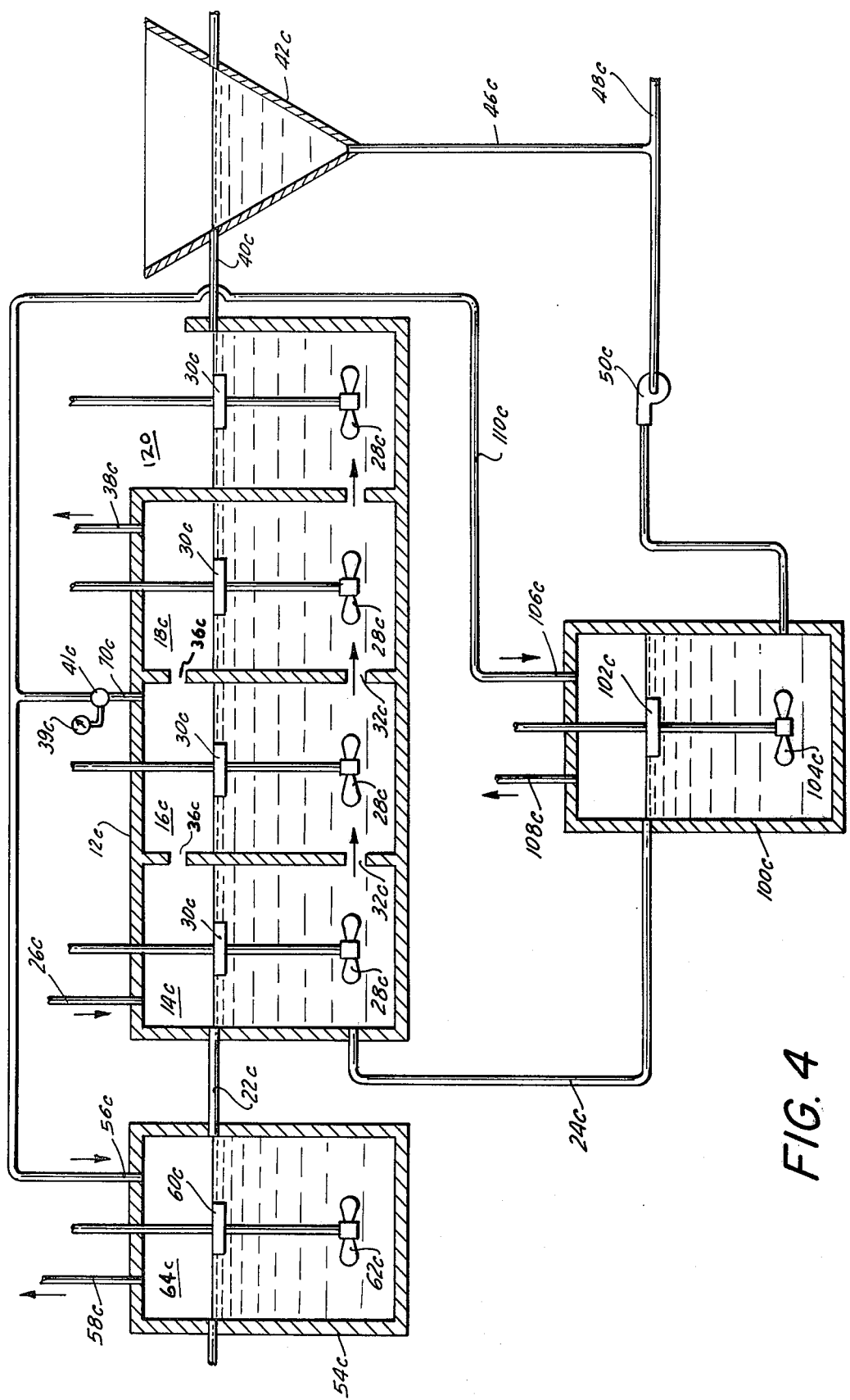

FIG. 4 shows an oxygen/air activated sludge treatment process and system as described in U.S. Ser. No. 226,199, filed Feb. 14, 1972, Spector et al., now U.S. Pat. No. 3,725,258 incorporated herein by reference. This system has an initial enclosed aeration stage 12c including a plurality of sub-zones 14c, 16c and 18c, and a subsequent open aeration stage 120 for final aeration treatment of the mixed liquor. In this embodiment oxygen enriched gas is diverted from an intermediate sub-stage 16c or even from the first sub-stage 14c, for introduction to the waste water nitrogen stripping tank 54c and the recycled sludge nitrogen stripping chamber 100c. Thus, as in the embodiments previously discussed, the waste water and/or the recycled sludge are stripped of nitrogen before introduction into an enclosed activated sludge aeration zone.

Figure 5:
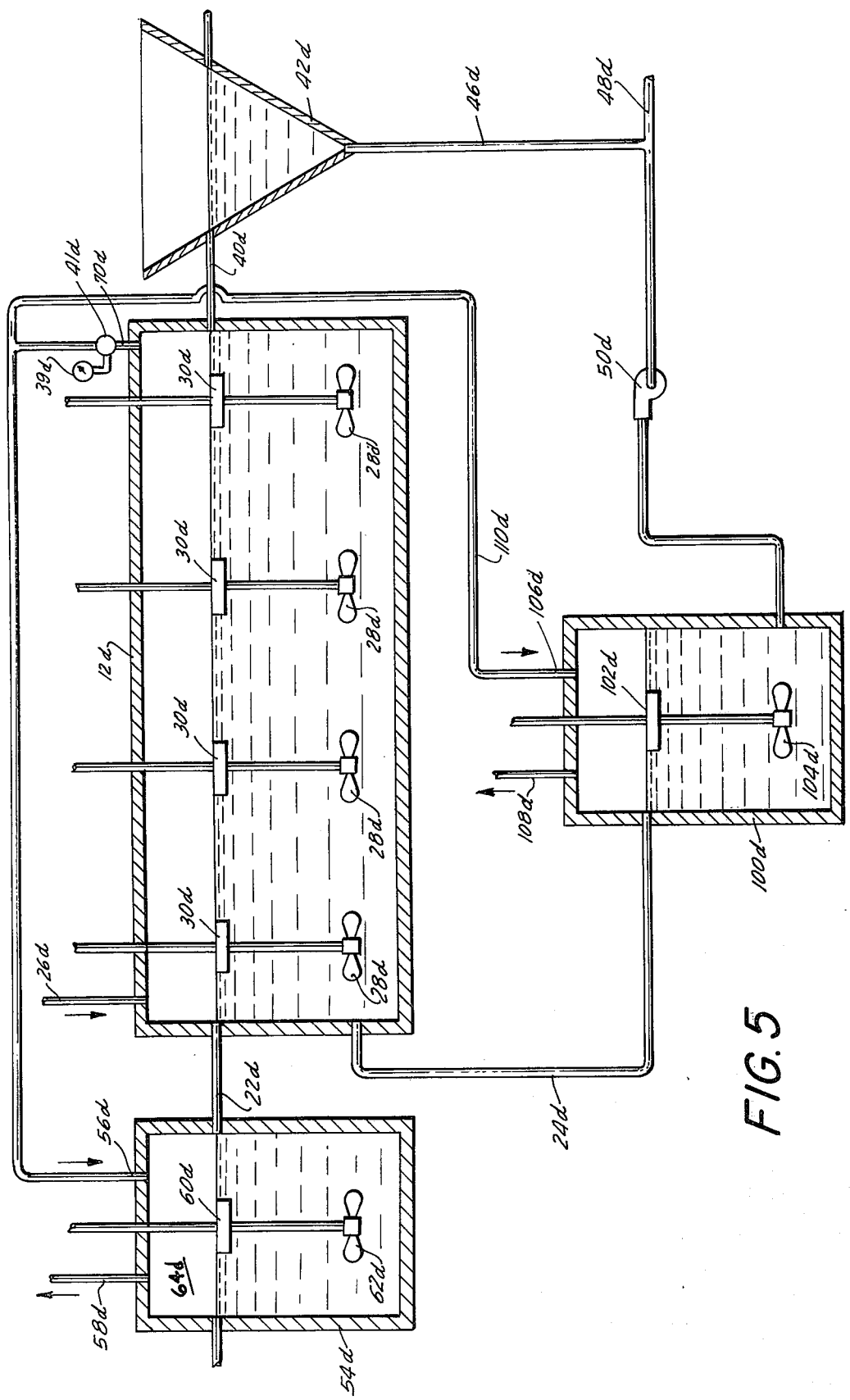

With reference to FIG. 5, the mixed liquor aeration zone 12d is shown without liquor or gas baffles and illustrates the present invention utilized in a completely mixed activated sludge system, or even a system which is not completely mixed but where the mixed liquor flows from the inlet end to the outlet end of the mixed liquor aeration zone without separate sub-zones or stages. The oxygen enriched gas may be concurrent to liquid flow as shown or may be counter-current to liquor flow if desired.

The oxygen enriched gas admitted to the systems shown in FIGS. 3, 4 and 5 through lines 26b, 26c and 26d, respectively, is from about 80 to about 100%, by volume, of oxygen, preferably high purity oxygen of on the order of 99.5% purity. Likewise, the gas vented from the aeration zone will have a concentration of oxygen above about 50%, by volume, preferably from about 70 to about 90%, by volume.

Test data compiled from a pilot plant operation utilizing apparatus according to the embodiment of FIG. 1 shows that above 90% of the BOD was removed from the waste water while utilizing over 90% of the oxygen supplied from a 99.5% purity oxygen source. In addition, the effluent drawn off from the sludge settler exhibited a greater clarity and was less turbid than the effluent obtained from the same apparatus under the same conditions but without a nitrogen stripping pretreatment.

It is to be understood that other modifications and embodiments may be proposed by those skilled in the art such as introduction of pure oxygen or oxygen enriched gas from a separate source to the nitrogen stripping tanks.

I claim:

1. An activated sludge process for treating wastewater containing organic matter and dissolved nitrogen gas which comprises the steps of: pretreating said wastewater without the addition of activated sludge in an enclosed wastewater pretreatment zone by contacting said wastewater with an oxygen enriched stripping gas having an oxygen content in excess of the oxygen content of air and having a partial pressure of nitrogen less than the partial pressure of nitrogen in ambient air, stripping at least 25% by weight of said dissolved nitrogen gas from said wastewater by contact with said oxygen enriched stripping gas, venting said stripped nitrogen gas from said pretreatment zone, thereafter feeding said pretreated wastewater and recirculated activated sludge to an enclosed aeration zone to form a mixed liquor in said enclosed aeration zone, introducing an oxygen enriched aeration gas into said enclosed mixed liquor aeration zone, biologically degrading the organic matter contained in said wastewater in contact with oxygen enriched aeration gas in said enclosed mixed liquor aeration zone, discharging said mixed liquor from said mixed liquor aeration zone, separating activated sludge from said discharge mixed liquor, and recirculating separated activated sludge downstream of said pretreatment zone to said mixed liquor aeration zone as said recirculated activated sludge, said oxygen enriched stripping gas comprising at least some oxygen enriched aeration gas withdrawn from said mixed liquor aeration zone.

2. The activated sludge process as claimed in claim 1 wherein at least 40% by weight of said dissolved nitrogen gas is stripped from said wastewater in said pretreatment zone.

3. The activated sludge process as claimed in claim 1 wherein the oxygen enriched stripping gas supplied to said wastewater pretreatment zone comprises at least 50% oxygen by volume.

4. The activated sludge process as claimed in claim 1 wherein the oxygen enriched aeration gas introduced into said enclosed mixed liquor aeration zone comprises at least 80% oxygen by volume, decreasing the oxygen content of said aeration gas during the biological degradation reacton in said enclosed mixed liquor aeration zone, venting aeration gas of decreased oxygen content from said mixed liquor aeration zone, and introducing at least a portion of said vented aeration gas into said enclosed wastewater pretreatment zone as said oxygen enriched stripping gas.

5. The activated sludge process as claimed in claim 4 wherein the oxygen enriched aeration gas introduced into said enclosed mixed liquor aeration zone has an oxygen concentration in the range of 80 to 100% oxygen by volume, and the vented aeration gas introduced into said enclosed wastewater pretreatment zone as said oxygen enriched stripping gas comprises at least 80% oxygen by volume.

6. The activated sludge process as claimed in claim 1 wherein said enclosed mixed liquor aeration chamber is comprised of a plurality of sub-zones, said mixed liquor flowing from sub-zone to sub-zone as the biological degradation proceeds, said oxygen enriched aeration gas flowing through said sub-zones and being reduced in oxygen content from sub-zone to sub-zone, and at least a portion of said aeration gas of reduced oxygen content is passed from one of said sub-zones to said enclosed wastewater pretreatment zone as said oxygen enriched stripping gas.

7. The activated sludge process according to claim 1 including the steps of passing recycled activated sludge to an enclosed sludge pretreatment zone, contacting said activated sludge in said enclosed sludge pretreatment zone with an oxygen enriched stripping gas having a partial pressure of nitrogen less than the partial pressure of nitrogen in ambient air, stripping dissolved nitrogen gas from said activated sludge in said enclosed sludge pretreatment zone, venting said stripped nitrogen gas from said enclosed sludge pretreatment zone, and recycling all of the activated sludge stripped of dissolved nitrogen gas from said enclosed sludge pretreatment zone to said enclosed mixed liquor aeration zone.

8. The activated sludge process as claimed in claiim 7 wherein said oxygen enriched stripping gas in said sludge pretreatment zone comprises oxygen enriched aeration gas withdrawn from said mixed liquor aeration zone.

* * * * *